March 25, 1952     T. KOULOMZINE     2,590,184
MAGNETOMETER

Filed April 29, 1947     2 SHEETS—SHEET 1

INVENTOR
Theodore Koulomzine
BY
Pennie, Edmonds, Morton & Barrows
ATTORNEYS

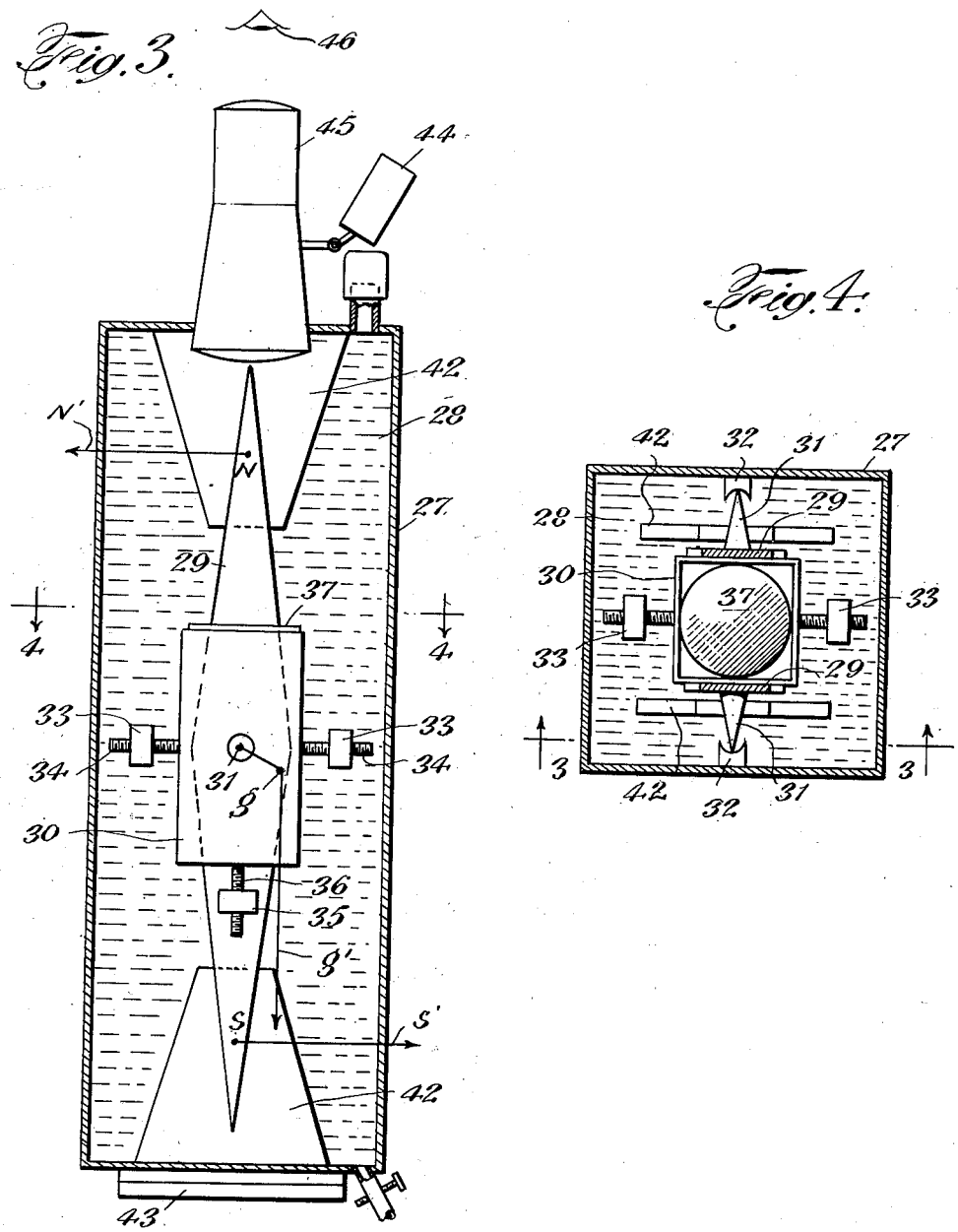

Patented Mar. 25, 1952

2,590,184

UNITED STATES PATENT OFFICE 2,590,184

MAGNETOMETER

Theodore Koulomzine, Val d'Or, Quebec, Canada

Application April 29, 1947, Serial No. 744,618

4 Claims. (Cl. 175—183)

The present invention relates to magnetometers and has for its object the provision of a new type of magnetometer, as well as certain improvements in existing types of magnetometers. The invention is especially concerned with instruments used for the measurement of the vertical and horizontal components, and variations thereof, of magnetic fields, especially the natural magnetic field.

The magnetometers proposed heretofore utilize either means for comparing the magnetic force to the gravity force or electrical coils for measuring the magnetic flux passing through these coils. The magnetometers using a comparison of the magnetic force to gravity are based on a balance system having a magnetic needle means for oscillation in a vertical plane, with the torque of the magnetic field vectors applied to the magnetic poles of the needle being counterbalanced by a gravity torque acting in the opposite direction. The sensibility and the fidelity of the balance-type magnetometers depend on the necessity of having the distance $a$ between the axis of support of the magnetic system and its center of gravity very small, usually in the order of 0.96 millimeters. Therefore, the quartz knife edge used in magnetometers as an axis of support has to be ground to a precision of a few millimicrons which can rarely be attained in practice. Very often, about every two months, the quartz edge becomes worn out and the bearing must be replaced.

The formula $$a_0 = \frac{M_0 Z}{mg}$$

gives the value of $a$ for a vertical magnetometer in zero position. $M_0$ is the magnetic moment of the magnetic system, $Z$ is the vertical component of the earth's magnetic field, $m$ is the total mass of the magnetic system, and $g$ is the acceleration of gravity. I have discovered a practical way of increasing the value of $a$ and rendering magnetometers less dependent on the sharpness of the knife edge or the pivot. I introduce a third counterbalancing force which is uniform and comparable to the force of gravity in order that the center of application of this force is fixed in a definite position.

My invention provides magnetometers having their balance systems suspended in a liquid which gives a buoyant force in opposition to the force of gravity, eliminating the necessity of the precision knife edge bearings and making it possible to use other bearings, such as pivots or shafts mounted in jewel bearings and the like. One important feature of the invention regardless of the kind of bearings used, is that the balance system is suspended in a non-compressible medium, and since it has substantially zero weight in the liquid, it has no inertia. Consequently, the usual rough handling that the instrument must undergo does not result in damage to the bearings. I have found it advantageous to attach a float to the balance system to offset the mass thereof resting on the bearings and to enclose the balance system in a suitable vessel for retaining the liquid in which the balance system and bearings are mounted.

In my invention, I utilize features of the more or less conventional magnetometers of the so-called vertical and horizontal types and attach a buoy or float, preferably a hollow closed metal vessel, to the permanent magnets supported on the bearings, and when the balance system is immersed in a liquid, I greatly reduce the apparent mass of the system. I use a liquid or a mixture of liquids that will not freeze under the prevailing conditions of use. It is advantageous to use a liquid which is a mixture of other liquids such as a mixture of ethyl alcohol with a heavy liquid, like carbon tetrachloride, to vary the density by varying the proportions.

These and other novel features of the invention will be better understood after considering the following discussion taken in conjunction with the accompanying drawings, in which:

Fig. 3 is a sectional side view along line 3—3 of Fig. 4 illustrating another embodiment of the invention;

Fig. 4 is a sectional plan view along line 4—4 of Fig. 3.

Figure 1:
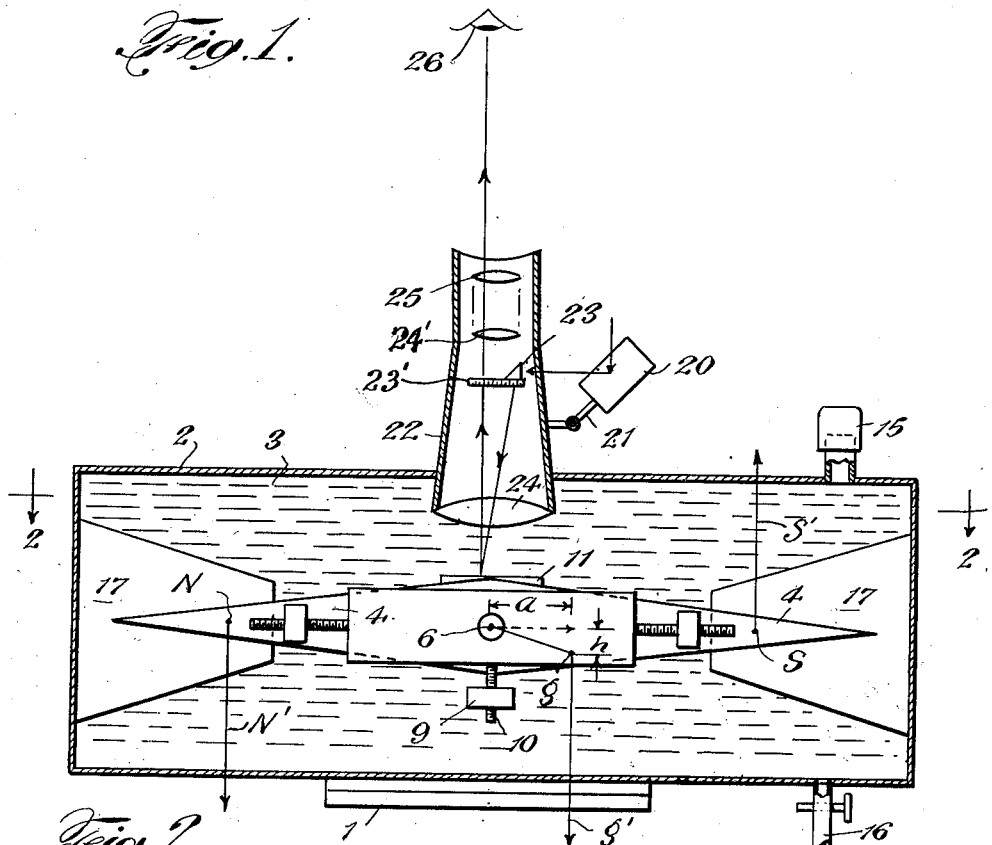
Fig. 1 is an elevational view along line 1—1 of Fig. 2 illustrating one embodiment of the invention.
Figure 2:
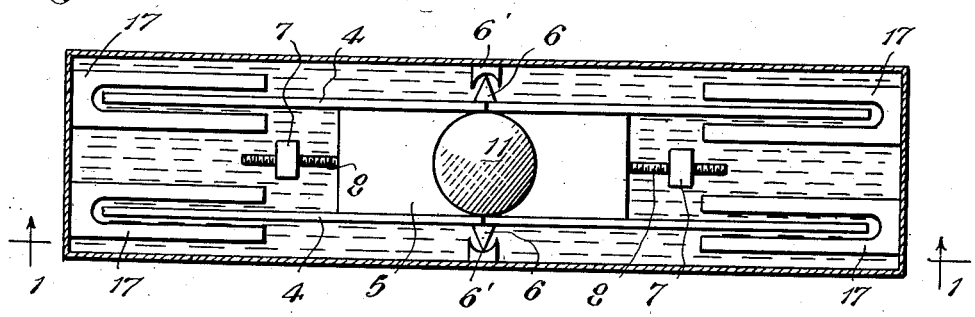
Fig. 2 is a sectional plan view along line 2—2 of Fig. 1.

The magnetometer illustrated in Figs. 1 and 2 is of the so-called vertical type. The balance system is free to oscillate in a vertical plane about its horizontal axis and the instrument is used for measuring the variations of the vertical component of the magnetic field. This meter comprises the usual rotary mounting members 1 which are for attachment to a tripod or the like. The vessel 2 for confining the liquid 3 is rigidly secured to the mounting member. The balance system that is actuated by the magnetic forces comprises a double bladed magnet 4 securely attached, as by welding or soldering, to the hollow metal float 5. The pivots 6 attached to the magnets engage suitably fixed bearing members 6'. The invention permits me to take advantageous use of the pivot type of bearings to support the balance system. These pivotal bearings may be similar to those used in watches and other instruments with the pivot pins 6, mounted in jewel or similar type bearing members 6', preferably attached to the sides of the magnets 4. The adjusting counterweights 7 mounted on the threaded pins 8 are attached to the ends of the float and the counterweight 9 is mounted on the threaded pin 10 attached to the bottom of the float. The mirror 11 is mounted on the upper surface of the float for the purpose of making determinations, as will be described later. The aforementioned elements which are supported on the pivots 6 and submerged entirely in the liquid 3 comprise the balance system of the meter.

All of the parts of the meter with the exception of the magnets are of non-magnetic material. The magnet blades are preferably formed of a metal of high magnetic flux density such as cobalt steel. The north pole N and the south pole S are preferably located as indicated, and the magnetic forces are represented by the arrows N' and S' extending vertically therefrom. The center of gravity $g$ is offset to the right of the pivot point the horizontal distance $a$ and downward or vertical distance $h$ (Fig. 1). The force of gravity is represented by the arrow $g'$.

In order that the vessel 2 may be completely filled with liquid for the purpose of eliminating bubbles so that the balance system is entirely surrounded with a non-compressible medium, I provide the filling cap 15 and the drain cock 16.

While the liquid has a pronounced tendency to dampen the fluctuations in the movement of the magnetic needles, I, nevertheless, find it advantageous to use the copper dampeners 17 to aid in bringing the needles to equilibrium for the purpose of more rapid reading.

I may use any suitable measuring device for recording the results. The device illustrated comprises means for making accurate determinations by the use of a beam of light. The mirror 20 supported by the adjustable arm 21 on the body of the telescope 22 reflects a beam of light through the prism 23, then through the graduated scale 23', then through the lens 24 and onto the surface of the mirror 11. This beam is reflected through lens 24, the graduated scale 23', then through the lenses 24' and 25 and is observed by the eye of the observer at 26. It will be apparent, therefore, that even very slight variations in the position of the balance system may be observed accurately.

Figs. 3 and 4 illustrate the so-called horizontal type of magnetometer used for measuring the variations of the horizontal component of the magnetic field, the magnetic system of which is free to oscillate about an horizontal axis with the magnets balanced in a vertical position when in equilibrium at the point of a normal magnetic field. The vessel 27 for confining the liquid 28 is provided with a filling opening and a drain cock, as in the meter of Fig. 1. The balance system suspended in the liquid comprises a double bladed permanent magnet 29 attached, as by soldering or welding, to a hollow metal float 30. The pivots 31 are advantageously attached to the sides of the magnet blades and are inserted in the bearing members 32 similar to those of Fig. 1. The counterweights 33 mounted on the horizontally disposed threaded pins 34 and the counterweight 35 mounted on the vertically disposed threaded pin 36 are used for adjusting the location of the center of gravity $g$ of the balance system. The mirror 37 attached to the top of the float is for making recordings by means of light. Although the liquid has a pronounced dampening effect on the fluctuations of the balance system, nevertheless I find it advantageous to use copper plates 42 to assist in restoring the magnetic needles to equilibrium when making determinations. The vessel 27 is securely attached to the usual rotary members 43 which are for mounting the instrument on a tripod or the like. The determinations of the fluctuations in the balance system are made by means of a mirror 44, telescope 45, and the observer's eye placed at 46, as described in connection with Fig. 1.

With the exception of the permanent magnets, all the parts of this meter are of non-magnetic materials.

As shown in Fig. 3, the north pole N and the south pole S have horizontal turning force components represented by the arrows N' and S' extending from these poles. The center of gravity $g$ of the balance system is both horizontally and vertically displaced to the right of the pivot point 31 and the gravitational force from this point is represented by the arrow $g'$.

I claim:

1. An improved magnetometer which comprises a vessel for confining a liquid, a balance system immersed in the liquid, means mechanically connecting the vessel and the balance system for maintaining the balance system at a predetermined position when in a normal magnetic field, said balance system being mounted to oscillate about a horizontal axis and comprising a permanent magnet and an attached float, the center of gravity of the balance system being displaced both horizontally and vertically from the axis, and means for making determinations in the movement of the balance system.

2. A magnetometer according to claim 1 which comprises metal dampers in the liquid adjacent the permanent magnet to aid in bringing the balance system to equilibrium.

3. An improved magnetometer which comprises a vessel for confining a liquid, a balance system including a float, a permanent magnet and counterweights immersed in the liquid, means for pivotally mounting the balance system in the vessel to oscillate about a horizontal axis, means for balancing the system at a predetermined position when in a normal magnetic field, the liquid being so selected and the float so proportioned with respect to the mass of the balance system that the force of gravity thereon is substantially zero, the center of gravity for the balance system being located an appreciable distance from the axis.

4. An improved magnetometer which comprises a balance system including a relatively strong permanent magnet, a float attached to the magnet, bearing means for oscillating the balance system about a fixed axis, counterweight means for adjusting the balance system to a predetermined position, a vessel for confining a liquid, the center of gravity of the balance system being located an appreciable distance from the axis, and means for supporting the balance system on the bearing means in the liquid.

THEODORE KOULOMZINE.

REFERENCES CITED

The following references are of record in the file of this patent:

UNITED STATES PATENTS

| Number | Name | Date |
|---|---|---|
| 1,328,187 | Oakley | Jan. 13, 1920 |
| 1,533,683 | Abbot | Apr. 14, 1925 |
| 1,909,619 | Herrick | May 16, 1933 |
| 1,943,850 | Truman | Jan. 16, 1934 |
| 1,976,636 | Roux | Oct. 9, 1934 |
| 2,010,245 | Roux | Aug. 6, 1935 |
| 2,041,072 | Kollsman | May 19, 1936 |
| 2,215,622 | Sperry | Sept. 24, 1940 |